United States Patent [19]
Lutus

[11] 3,919,546
[45] Nov. 11, 1975

[54] APPARATUS FOR OBTAINING AN ELECTRICAL SIGNAL FROM MECHANICAL MOTION

[75] Inventor: Paul A. Lutus, Parkridge, N.J.

[73] Assignee: North American Philips Corporation, New York, N.Y.

[22] Filed: May 29, 1974

[21] Appl. No.: 474,451

[52] U.S. Cl. ............... 250/205; 250/212; 250/232
[51] Int. Cl.².... G01J 1/32; G01D 5/36; H01J 39/12
[58] Field of Search .......... 250/205, 229, 231, 232, 250/552, 212

[56] References Cited
UNITED STATES PATENTS

| | | |
|---|---|---|
| 3,093,743 | 6/1963 | Inderwiesen .................... 250/232 |
| 3,517,167 | 6/1970 | Bell ............................... 250/205 X |
| 3,619,612 | 11/1971 | Belke ............................ 250/212 X |

*Primary Examiner*—James W. Lawrence
*Assistant Examiner*—T. N. Grigsby
*Attorney, Agent, or Firm*—Frank R. Trifari; Simon L. Cohen

[57] ABSTRACT

A photo-electric apparatus for tracking a periodically moving object in order to provide an accurate electrical signal corresponding to the mechanical motion of an object. A shutter connected to the object interrupts a light path between a light source and a photo cell. A feedback path between the photo cell and the light source integrates the photo cell output and compensates for the drift in the photo cell and light source caused by ambient temperature changes, foreign matter and aging.

4 Claims, 1 Drawing Figure

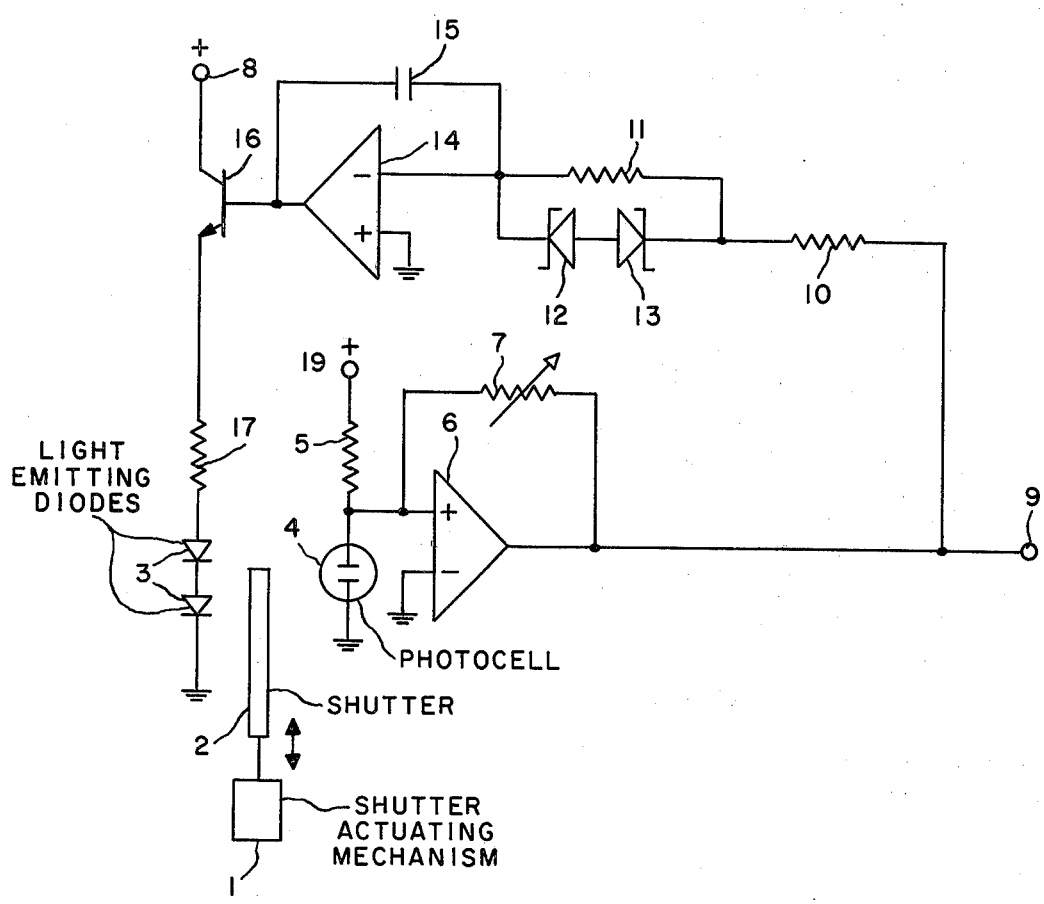

APPARATUS FOR OBTAINING AN ELECTRICAL SIGNAL FROM MECHANICAL MOTION

BACKGROUND OF THE INVENTION

The present invention relates to an apparatus designed to provide an accurate electrical signal corresponding to the periodic motion of an object, and in particular to an apparatus of this type using a photo cell, a light source and a shutter.

DESCRIPTION OF THE PRIOR ART

An example of an apparatus for converting the oscillating motion of an object into an electrical signal is shown in U.S. Pat. No. 1,565,596. In this patent a shutter attached to a pendulum interrupts a light path between an incandenscent lamp and a photoelectric cell. Inaccuracies in such a system result from the sensitivity of the photo cell to temperature changes and to aging. The luminous output of the lamp also varies with age. Feedback has been used in such devices primarily to maintain the oscillating motion of the shutter. An example of such a system employing feedback in order to sustain oscillations is shown in U.S. Pat. No. 3,093,743.

SUMMARY OF THE INVENTION

The principal object of the invention is to provide a light source and photo cell apparatus for accurately converting the periodic mechanical motion of a shutter into an electrical signal in an enviorment subject to wide fluctuations in temperature and foreign matter such as dust. This object is accomplished by integrating the output of the photo cell and by feeding back this integrated signal as a control signal for regulating the luminous output of the light source.

BRIEF DESCRIPTION OF THE DRAWING

The appended drawing shows one example of a preferred embodiment of the invention. Other variations of the apparatus will become apparent from the following description of the preferred embodiment.

In the drawings:

The FIGURE is a schematic diagram of a preferred embodiment of the apparatus according to the invention.

As shown in the drawing a shutter actuating mechanism 1 oscillates a shutter 2 in a light path between light emitting diodes (LED's) 3 and photo cell 4. The shutter actuating mechanism is an object subjected to oscillatory motion, such as a scanning mirror of an infrared detector. Such an infrared detector is shown in U.S. Pat. No. 3,509,345, and consists of a scanning mirror and a device for producing electrical signals in response to the infrared radiation directed thereon by the mirror. My device is used in this instance in order to synchronize the scanning circuits of a television type monitor with the motion of a scanning mirror in an infrared detector. Thus, the shutter 2 of the apparatus according to the invention is mechanically connected to such a scanning mirror schematically shown in the drawings as shutter actuating mechanism 1. The shutter 2 blocks the light from the LED's to a greater or lesser extent from reaching photo cell 4 depending on the position of the shutter. Photo cell 4 may be any device that provides a change in an electrical parameter, such as resistance, current or potential, in response to a change in the luminous intensity of radiation impinging thereon. In this preferred embodiment the photo cell 4 is a solar cell. The values of resistor 5 and the bias potential on terminal 19 are such that the photo cell output current is balanced by a current from the bias voltage and the resistance when the shutter is at the mid point of its oscillatory motion, resulting in an average input current to operational amplifier 6 of zero.

Variable resistor 7 sets the effective amplification factor of operational amplifier 6. The oscillatory output signal from the operational amplifier 6 is provided at output terminal 9 of the apparatus. In some instances the movement of a shutter actuating mechanism is periodic but not symmetrical. One simple example of such motion can be described as a "modified sawtooth" movement where the mirror is linearly scanned relatively slowly in one direction from a "start" position, is rapidly reset to the "start" position at the end of the relatively slow scan and remains stationary for the remainder of the scanning period. Obviously, the mid point of the scan in this case does not represent the average position of the shutter. The average position of the shutter in the case of such a modified sawtooth scanning motion would be closer to the "start" position. By the action of an integrating negative feedback path, later to be discussed, the luminous output of the LED's are automatically assisted so that the average current at the input of amplifier 6 is equal to zero.

The periodic signal from the output of amplifier 6 is connected to an integrating operational amplifier consisting of resistors 10 and 11, Zener diodes 12 and 13, capacitor 15 and operational amplifier 14. In order to use the integrator in a negative feedback path the inverting output of the operational amplifier 14 is used. The time constant of the integrator is much greater than the period of the mechanical motion of the shutter. The integrator thereby functions as a "0-pass" filter, that is, it passes only the long term average value of the output of operational amplifier 6. In the normal operating mode Zener diodes 12 and 13 do not conduct. When the apparatus is initially turned on, however, it is desirable that the electrical transients present when any normal electrical circuit is first energized, are eliminated as quickly as possible in order to prevent the operational amplifiers from being overdriven for a prolonged period of time. Thus, in response to the higher current flowing through the resistor 11 during electrical transients that are present when the apparatus is initially energized the Zener diodes 12 and 13 conduct and thereby lower the time constant of the integrator and decrease the response time of the feedback loop.

In response to the output of operational amplifier 14 the emitter-collector path of transistor 16 varies the flow of current from terminal 8 through resistor 17 to LED's 3.

If, for example, the luminous output of LED's 3 were to increase due to a change in ambient temperature, the increase in average value of the output of LED's 3 would increase the average output of photo cell 4 and result in a decrease in the amplitude of the potential applied to the base of transistor 16 by the integrating operational amplifier. The drop in the potential at the base of transistor 16 decreases the current through LED's 3 and lowers the luminous intensity output thereof. On the other hand, a decrease in output from photo cell 4 due to temperature changes or aging of the photo cell material would decrease the average output of operational amplifier 6 and would result in an increase in the current through LED's 3 due to the action of the integrating operational amplifier.

An additional benefit of the integrating feedback compensation is that the gain of the measuring system is also maintained at a fixed level in spite of ambient conditions and aging problems. That is, the change in output signal of amplifier 6 for a given change in shutter position is automatically maintained by the integrating feedback loop.

The use of a plurality of LED's sequentially arranged in a direction substantially parallel to the direction of shutter motion provides an elongated substantailly uniform low noise radiation source. While the system would work with an incandescent or flourescent radiation source the fluctuations in light output due to the vibration of the incandescent filament or changes in the ionization level of the flourescent lamp would produce interferring noise in the output of the measuring system.

Typical values for the elements of the preferred embodiment are as follows:

Resistors
5-47K ohms
7-100K ohms
10-1.5K ohms
11-200K ohms
17-10 ohms
Capacitor
15-22 microfarads
Shutter Frequency
15Hz

What I claim is:

1. An apparatus for converting periodic movements of an object into an electrical signal comprising a source of radiation, a solar cell in the path of the radiation from said radiation source for converting the radiation into an electrical signal corresponding to the magnitude of the radiation impinging thereon, a shutter in the path of the radiation between said radiation source and said photo cell means and mechanically connected to said object for partially blocking the radiation from the radiation source from impinging on said solar cell in response to the periodic motion of said object, whereby the solar cell provides an electrical output signal corresponding to the motion of the object, a source of bias current connected to said solar cell and having a constant magnitude equal to the instantaneous magnitude of the output current of the solar cell when the shutter is at the average position thereof, the direction of the currents from said bias source and said solar cell being opposite with respect to the point of connection between the bias source and the solar cell, both said solar cell and said radiation source means further providing undesirable gradual changes in output in response to ambient conditions and aging phenomena, and negative feedback means for integrating the output signal from said solar cell and for varying the radiation output level of said radiation source inversely as the integral of the electrical output signal from said solar cell.

2. An apparatus for converting periodic movements of an object into an electrical signal comprising a plurality of LED's providing radiation, photoelectric means in the path of the radiation from said LED's for converting the radiation into an electrical signal corresponding to the magnitude of the radiation impinging thereof, a shutter in the path of the radiation between said LED's and said photo cell means and mechanically connected to said object for paritally blocking the radiation from the LED's from impinging on said photoelectric means in response to the motion of said object, whereby the photoelectric means provides an electrical output signal corresponding to the motion of the object, both said photoelectric means and said LED's further providing undesirable gradual changes in output in response to ambient conditions and aging phenomena, an integrating operational amplifier, means connecting an input of the integrating operational amplifier to the electrical output signal of the photoelectric means, a transistor having an emitter-collector path connected in series with said plurality of LED's and having a base connected to the output of said integrating operational amplifier for controlling the current through said LED's.

3. Apparatus as recited in claim 2, wherein said means for connecting the elctrical signal from the photo-electric means to the integrating operational amplifier comprises a further amplifier having an input connected to the photo-electric means and having an output connected to the input of said integrating operational amplifier, the output of said apparatus being provided by said further amplifier.

4. Apparatus as recited in claim 2, further comprising circuit means responsive to the rapid transient currents present during the initial energization of the apparatus for decreasing the response time of said integrating operational amplifier.

* * * * *

UNITED STATES PATENT AND TRADEMARK OFFICE
CERTIFICATE OF CORRECTION

PATENT NO. : 3,919,546
DATED : November 11, 1975
INVENTOR(S) : PAUL A. LUTUS

It is certified that error appears in the above-identified patent and that said Letters Patent are hereby corrected as shown below:

IN THE DRAWINGS

In amplifier 6, the terminal labelled "+" should be labelled -- - --; while the terminal labelled "-" should be labelled -- + --.

IN THE CLAIMS

Claim 1, lines 3, 11, 12, 14, 16, 20, 21, 25 and 27, change "solar cell" to --photo cell means--;

line 18, change "solar" to photo cell means--;

line 19, cancel "cell";

Signed and Sealed this twenty-second Day of June 1976

[SEAL]

Attest:

RUTH C. MASON
Attesting Officer

C. MARSHALL DANN
Commissioner of Patents and Trademarks